US010111013B2

(12) United States Patent
Hu

(10) Patent No.: US 10,111,013 B2
(45) Date of Patent: Oct. 23, 2018

(54) DEVICES AND METHODS FOR THE VISUALIZATION AND LOCALIZATION OF SOUND

(71) Applicant: SENSE INTELLIGENT, Toronto (CA)

(72) Inventor: Hai Hu, North York (CA)

(73) Assignee: SENSE INTELLIGENT, Toronto, ON (CA)

( * ) Notice: Subject to any disclaimer, the term of this patent is extended or adjusted under 35 U.S.C. 154(b) by 0 days.

(21) Appl. No.: 14/762,964

(22) PCT Filed: Jan. 24, 2014

(86) PCT No.: PCT/CA2014/050049
§ 371 (c)(1),
(2) Date: Jul. 23, 2015

(87) PCT Pub. No.: WO2014/113891
PCT Pub. Date: Jul. 31, 2014

(65) Prior Publication Data
US 2016/0142830 A1    May 19, 2016

Related U.S. Application Data

(60) Provisional application No. 61/756,535, filed on Jan. 25, 2013.

(51) Int. Cl.
G09G 5/00 (2006.01)
G09B 5/02 (2006.01)
(Continued)

(52) U.S. Cl.
CPC ........... H04R 25/407 (2013.01); G02C 11/06 (2013.01); G06T 11/60 (2013.01); G06T 19/006 (2013.01);
(Continued)

(58) Field of Classification Search
CPC ...................................................... G06T 19/003
(Continued)

(56) References Cited

U.S. PATENT DOCUMENTS 3,531,595 A * 9/1970 Demaree ................. A61B 5/12
434/185
5,029,216 A * 7/1991 Jhabvala ................ G02C 11/06
381/26

(Continued)

FOREIGN PATENT DOCUMENTS

EP    2469323 A1    6/2012
FR    2899097 A1    10/2007
(Continued)

OTHER PUBLICATIONS

"Discrete Representation of Signals on a Logarithmic Frequency Scale", Aki Harma et al. Oct. 21-24, 2001, New Paltz, New York.*
(Continued)

Primary Examiner — Javid A Amini
(74) Attorney, Agent, or Firm — Hill & Schumacher

(57) ABSTRACT

Methods and devices are provided for processing sound signals, localizing sound signals corresponding to one or more sound sources, and rendering, on a wearable display device, an acoustic visualization corresponding to localized sound sources. A wearable visualization device may include two or more microphones for detecting sounds from one or more sound sources, and display devices for displaying the acoustic visualizations, optionally in a stereographic manner. A sound source may be located by processing the sound signals recorded by the microphones to localize sound signals corresponding to a given sound source, and processing the localized sound signals to identify the location of the sound source. The acoustic visualization may be a frequency-domain visualization, and may involve a mapping of frequency to color. The acoustic visualization devices and (Continued)

methods provided herein may assist in training the human brain to comprehend sound visualization signals as sound signal itself.

23 Claims, 14 Drawing Sheets

(51) Int. Cl.
| H04R 25/00 | (2006.01) |
| G02C 11/06 | (2006.01) |
| H04R 3/00 | (2006.01) |
| G06T 11/60 | (2006.01) |
| G06T 19/00 | (2011.01) |
| G09B 19/04 | (2006.01) |
| G10L 21/14 | (2013.01) |

(52) U.S. Cl.
CPC ............... *G09B 5/02* (2013.01); *G09B 19/04* (2013.01); *G10L 21/14* (2013.01); *H04R 3/005* (2013.01)

(58) Field of Classification Search
USPC ........................................................ 345/440
See application file for complete search history.

(56) References Cited

U.S. PATENT DOCUMENTS

| 5,901,232 | A  | * | 5/1999  | Gibbs ..................... H04R 1/406 381/92 |
| 6,600,824 | B1 | * | 7/2003  | Matsuo .................. H04R 3/005 381/122 |
| 8,688,251 | B2 | * | 4/2014  | Ullrich .................... G10L 21/06 340/407.1 |
| 2002/0087322 | A1 | * | 7/2002  | Fletcher ............... A61B 5/4803 704/270 |
| 2002/0097885 | A1 | * | 7/2002  | Birchfield ............. H04R 1/406 381/92 |
| 2002/0103649 | A1 | * | 8/2002  | Basson .................. A61F 11/04 704/270 |
| 2004/0104702 | A1 | * | 6/2004  | Nakadai ................... B25J 13/00 318/568.12 |
| 2004/0149036 | A1 | * | 8/2004  | Foxlin ................... A61B 5/1113 73/511 |
| 2006/0224438 | A1 | * | 10/2006 | Obuchi .................. G06Q 30/02 704/270 |
| 2007/0195012 | A1 | * | 8/2007  | Ichikawa ............. G02B 27/017 345/8 |
| 2007/0242040 | A1 | * | 10/2007 | Ullrich .................... G10L 21/06 345/157 |
| 2009/0281810 | A1 | * | 11/2009 | Sziklai .................... G10L 21/06 704/276 |
| 2010/0188929 | A1 | * | 7/2010  | Kitaura ................. G06F 1/1605 367/13 |
| 2012/0162259 | A1 | * | 6/2012  | Sakai ..................... G01S 3/8083 345/634 |
| 2013/0336629 | A1 | * | 12/2013 | Mulholland ............. H04N 9/87 386/230 |
| 2015/0324692 | A1 | * | 11/2015 | Ritchey ................ G05D 1/0038 348/14.08 |

FOREIGN PATENT DOCUMENTS

| JP | 2009533714 | 9/2009 |
| JP | 2009543108 | 12/2009 |
| JP | 2315201 | 4/2011 |
| KR | 1020110046937 | 5/2011 |
| KR | 1020110139507 | 12/2011 |
| WO | WO2006034569 | 4/2006 |
| WO | WO2007084122 | 7/2007 |
| WO | WO2008105661 A1 | 9/2008 |
| WO | WO2009043036 | 6/2009 |
| WO | WO2011147015 | 12/2011 |

OTHER PUBLICATIONS

A wearable tactile intonation display for the deaf , A. Boothroyd IEEE Transactions on Acoustics, Speech, and Signal Processing Year: 1985, vol. 33, Issue: 1.*

Color display system for connected speech to be used for the hearing impaired A. Watanabe; Y. Ueda; A. Shigenaga IEEE Transactions on Acoustics, Speech, and Signal Processing Year: 1985, vol. 33, Issue: 1.*

Bach-Y-Rita P, Kercel SW., "Sensory substitution and the human-machine interface", Trends Cogn Sci. 2003; 7:541-546.

* cited by examiner

DEVICES AND METHODS FOR THE VISUALIZATION AND LOCALIZATION OF SOUND

CROSS-REFERENCE TO RELATED APPLICATION

This application is a national phase stage filing under 35 U.S.C. 371 of International Application No. PCT/CA2014/050049 filed Jan. 24, 2014 and claims priority to U.S. Provisional Application No. 61/756,535, titled "3D COLORED REAL-TIME ORIENTATIONAL SOUND SOURCE VISUALIZATION" and filed on Jan. 25, 2013, the entire contents of which are incorporated herein by reference.

BACKGROUND

The present disclosure relates generally to hearing assistive devices and augmented reality devices.

There are 80,000 people in Canada, over 1,000,000 in the US, and more than 20,000,000 people in the world who are completely deaf. For these people, normal hearing-aid devices do not help. Cochlear implants work for some individuals but they are invasive and the operation cost is extremely high.

Five percent of the world's population is suffering from hearing-loss. The existing hearing-aid devices provide poor performance in a noisy environment, especially when the user wishes to listen to a remote sound source, as opposed to closer sound sources.

SUMMARY

Methods and devices are provided for processing sound signals, localizing sound signals corresponding to one or more sound sources, and rendering, on a wearable display device, an acoustic visualization corresponding to localized sound sources. A wearable visualization device may include two or more microphones for detecting sounds from one or more sound sources, and display devices for displaying the acoustic visualizations, optionally in a stereographic manner. A sound source may be localized by processing the sound signals recorded by the microphones to localize sound signals corresponding to a given sound source, and processing the localized sound signals to identify the location of the sound source. The acoustic visualization may be a frequency-domain visualization, and may involve a mapping of frequency to colour.

Accordingly, in one aspect, there is provided a method of rendering an acoustic visualization on an acoustic visualization device, the acoustic visualization device comprising a wearable display device and two or more microphones, the method comprising:

recording, via the microphones, sound signals from one or more sound sources;

processing the sound signals to extract localized sound signals associated with at least one of the sound sources;

rendering, on the acoustic visualization device, an acoustic graphic providing a visual representation of the localized sound signals.

In another aspect, there is provided an acoustic visualization device comprising:

a wearable display device for displaying an image viewable by at least one eye of a wearer thereof;

two or more microphones associated with the wearable display device; and computing hardware connected to the display device and the microphones, wherein the computing hardware is configured to:

record, via the microphones, sound signals from one or more sound sources;

process the sound signals to extract localized sound signals associated with at least one of the sound sources;

render, on the display device, an acoustic graphic providing a visual representation of the localized sound signals. A further understanding of the functional and advantageous aspects of the disclosure can be realized by reference to the following detailed description and drawings.

BRIEF DESCRIPTION OF THE DRAWINGS

Embodiments will now be described, by way of example only, with reference to the drawings, in which.

DETAILED DESCRIPTION

Figure 1:
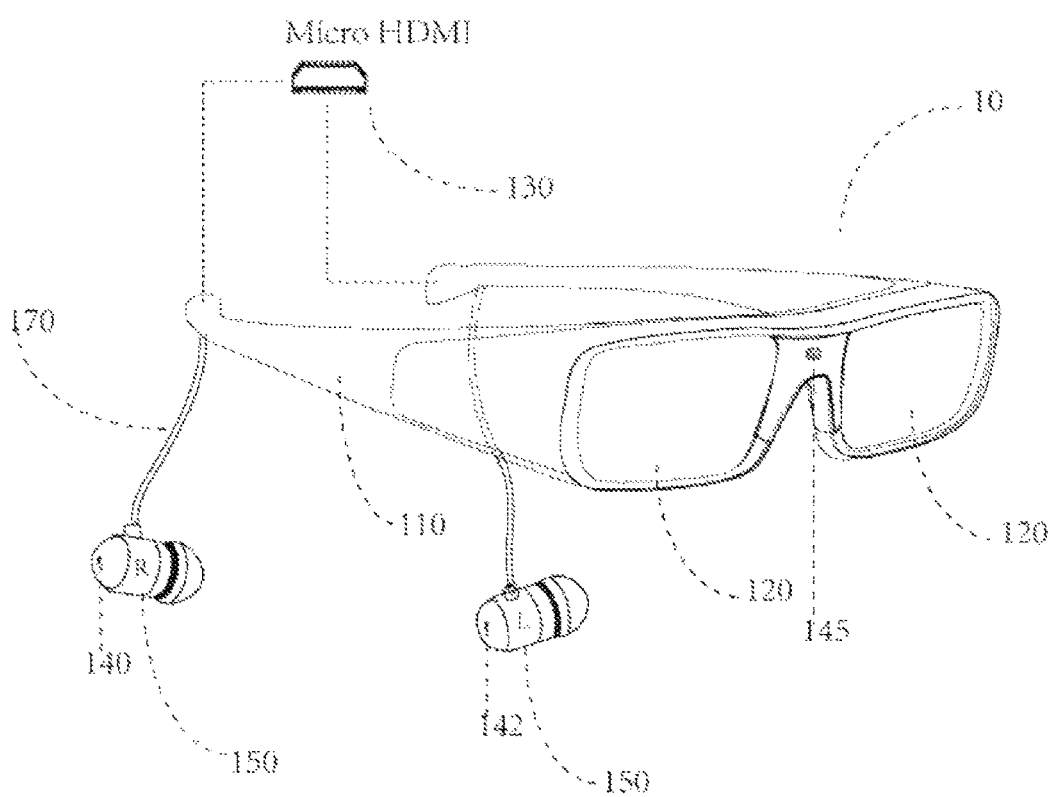
FIG. 1 shows an example acoustic visualization device including s transparent stereoscopic 3D projection glasses.

Various embodiments and aspects of the disclosure will be described, with reference to details discussed below. The following description and drawings are illustrative of the e disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure.

As used herein, the terms, "comprises" and "comprising" are to be construed as being inclusive and open ended, and not exclusive. Specifically, when used in the specification and claims, the terms, "comprises" and "comprising" and variations thereof mean the specified features, steps or components are included. These terms are of to be interpreted to exclude the presence of other features, steps or components.

As used herein, the term "exemplary" means "serving as an example, instance, or illustration," and should not be construed as preferred or advantageous over other configurations disclosed herein.

As used herein, the terms "about" and "approximately" are meant to cover variations that may exist in the upper and lower limits of the ranges of values, such as variations in properties, parameters, and dimensions. In one non-limiting example, the terms "about" and "approximately" mean plus or minus 10 percent or less.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

Embodiments of the present disclosure provide wearable display devices that are configured to detect and process audio signals, and to subsequent render and display visualizations of the audio signals. In some embodiments, the audio signals are processed to identify the location of one or more audio sources, such that the locations of the audio sources are presented to the device wearer on the display. The display device may be a virtual reality (or augmented reality) wearable stereographic display device for displaying visual and localized audio representations (an acoustic visualization) in 3D. By providing a visualization of detected audio signals, embodiments of the present disclosure provide methods and devices that may be effective in simulating the function of the human cochlea for communicating acoustic stimulation signals to the brain.

The methods and devices disclosed herein may find application in the training of the human brain to comprehend visualized acoustic signals as sound itself, and thereby recover, or assist in the recovery, of at least a portion of the hearing capacity of a deaf or hearing-impaired individual. As further described below, aspects of the present disclosure may also assist in the training of speech for those who are deaf or hearing impaired, for example, for the improvement of speaking accuracy, based on visualized sound. By displaying the acoustic signals in a manner that stimulates human visual system, analogous to the manner in which sound stimulates the audial system, the human brain may more easily accept the visual stimulates as the audial stimulates.

Referring now to FIG. 1, an example acoustic visualization device 10 is illustrated. Example device 10 includes frame 110, partially-transparent display elements 120, micro HDMI ports 130, earpieces 150 having integrated microphones 140 and 142, and additional microphone 145. Display elements 120 may be refractive lenses, or substantially non-refractive (planar) optical elements.

In the example embodiment shown in FIG. 1, device 10 is configured as an optical see-through display device, configured to project an image onto a user's eye, while allowing the user to look through display elements 120 (e.g. the display device is at least partially transparent). For example, the image may be formed by an optical engine (supported on or within the frame), which couples display light into an waveguide formed within an display element 120, where the waveguide directs the guided display light towards to wearer's eyes, where an image is formed. In the example embodiment shown in FIG. 13, the left and right display elements 120 together provide stereoscopic 3D visualizations (visual representations) of acoustic sources.

As described in more detail below, the processing of the audio signal may include localization of one or more audio signals, which are detected by microphones 140, 142 provided on or within earpieces 150, and optionally also by additional microphone 145 (described in further detail below), which are connected to frame 110 through wires 170.

The audio signals collected from microphones ay be transmitted to a processing unit (further described below) through wires (e.g. an audio cable) or via a wireless communication device or protocol such as Bluetooth.

A power supply may be integrated into frame 110 to provide power to display unit 10. A rechargeable battery may be used to provide power.

Figure 2:
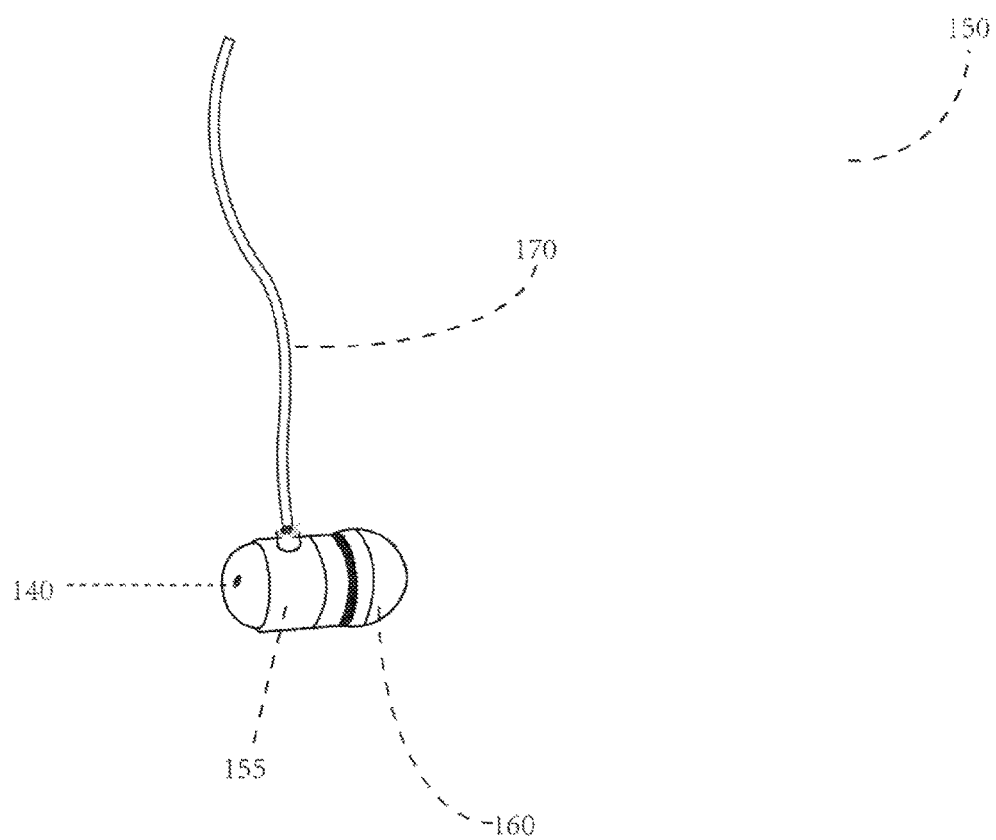
FIG. 2 is an example of an earpiece including an earphone an integrated earphone and microphone.

Referring now to FIG. 2, earpieces 150 may be configured as in-ear devices that comprise external microphone 140 and an insertable support potion 160. By placing the earpieces in the human ear, microphone 140 may be positioned to collect the sounds in the same way as in normal hearing. In some embodiments, multiple microphones may be provided, for example, to employ the reflection of the human body (e.g. auricle, cheek) to distinguish the sounds from the above and/or from the below. It is to be understood that FIG. 2 is provided for illustrating an example device for employing the human ear as a natural acoustic collection means, and that alternative variations may be employed for positioning a microphone within or near the ear canal to achieve the same or a similar result.

Referring again to FIG. 1, although example device 10 is illustrated as a pair of glasses adapted for providing a 3D (stereographic) display, it is to be understood that the scope of the present disclosure is not intended to be limited to this example embodiment, and that a wide variety of virtual reality wearable audio/visual devices or headgear may be employed to record the audio signal in a manner that is suitable for localization, and to display a suitable visualization of the audio signal, or a portion thereof, to the device wearer. In some embodiments, such the embodiment shown in FIG. 1, the shape of the acoustic visualization device resembles 3D game glasses, which provide a hidden design that could be acceptable to hearing-disabled people, especially deaf children in school.

In some embodiments, the virtual reality device may be any wearable display device suitable for recording and spatially locating an audio signal, and for displaying, to the device wearer, a spatially localized visual representation of the audio signal. For example, in other non-limiting alternative embodiments, other virtual reality heads-up display devices may be employed, such as goggles, helmets and other virtual reality headgear or headsets, or head-mounted displays. For example, the device may be a heads-up display system having a near-eye display unit that includes a display apparatus. Other non-limiting example embodiments include a display comprising a liquid crystal display (LCD), light emitting diodes (LEDs), a molded polymer display, or a free space reflection display, or another means of image generation. Another example embodiment is a wearable computer including a head-mounted display with a binocular display or a monocular display.

In another example implementation, the acoustic visualization device may include at least one holographic display device that provides a holographic display in one eye. The hologram displays, in a real-time, dynamic, and semi-transparent manner, stereoscopic 3D images and/or videos providing acoustic signal visualization and localization.

In embodiments which the acoustic source need not be located in three dimensions (for example, no depth information is needed), the acoustic visualization device may be configured to display the visualized audio signal in a single eye. For example, the acoustic visualization device may, in such an embodiment, include only a single display device or projection device for displaying the visualized audio source in one eye.

Although example device 10 is shown in FIG. 1 as having three microphones attached thereto, where two microphones 140 are provided on insertable earpieces, it is to be understood that the microphones may be provided according to a wide range of configurations, provided that they are suitably arranged to support localization in at least two dimensions. In some embodiments, two microphones are provided in a stereophonic configuration, such as on lateral sides of the wearer of the device. Although providing two microphones on insertable earpieces is advantageous, as it employs the natural sound collection abilities of the human ear, the microphones may be provided in other locations, such as, but not limited to, on the frames of the glasses or goggles of a wearable display device on a headband or hat, or on clothing, such as a belt.

In some embodiments, the wearable device includes one or more additional microphones, such that the total number of microphones exceeds two. In the embodiment shown in FIG. 1, additional microphone 145 is provided to support acoustic localization. The additional microphone allows for acoustic localization in three dimensions, which may be desirable in selected applications involving 3D sound localization, or to assist with selected hearing disorders.

In some embodiments, the one or more additional microphones may also provide a reference sound signal to the processing unit (described below) for performing a target-selective filtering algorithm. The one or more additional microphones may be located in any suitable location for providing acoustic information that enables full 3D acoustic localization.

In other embodiments, the one or more additional microphones may be provided in other locations. For example, in one example implementation, two additional microphones may be provided on the front face of frame 110. In some embodiments, the microphones may be provided in such a way that they are disguised as ornamental features of device 10.

Figure 3:
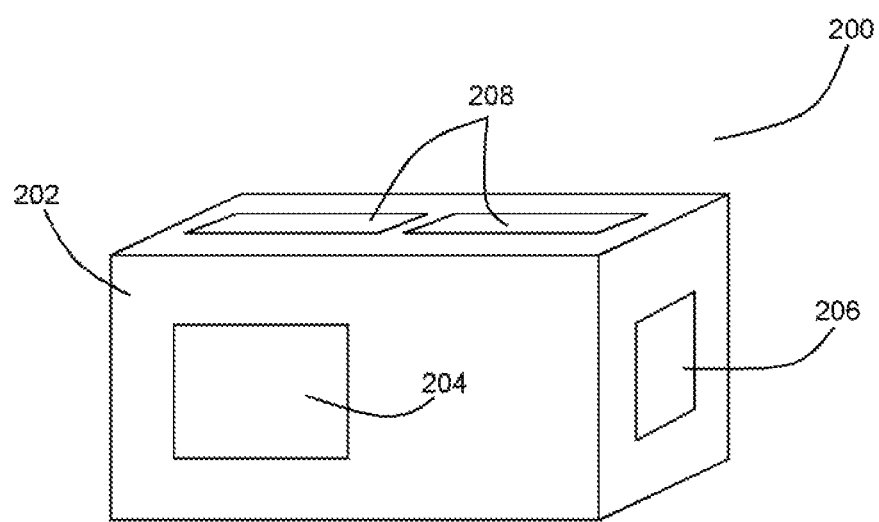
FIG. 3 shows an example illustration of a processing unit for processing audio and video signals.

In some embodiments, processing of the recorded audio, and rendering of a visual representation of the audio signal is performed by a processing unit that is interfaced with device 10. Referring now to FIG. 3, an example embodiment of a processing unit 200 is illustrated. Example processing unit 200 includes housing 202, battery or battery pack 204, on/off switch 206, and micro HDMI connectors 208. Computer or processing hardware, such as a system-on-a-chip (SoC) device/circuit, is provided within housing 20 and interfaced with connectors 208.

As illustrated above processing unit 200 may be a separate computing device that interfaces with acoustic visualization device 10 through a direct connection (e.g., via optical or electrical cables), or through a wireless connection. In some embodiments, processing unit 200 is an application-specific device configured to be interfaced with acoustic visualization device 10. In other example embodiments, processing unit may be a mobile computing device such as a smartphone, tablet, or laptop. In another example embodiment, processing unit 200 may be general purpose computer. In yet another embodiment, processing unit 200, or a portion thereof, may be attached to, formed within, or otherwise supported by display device 10.

Figure 4:
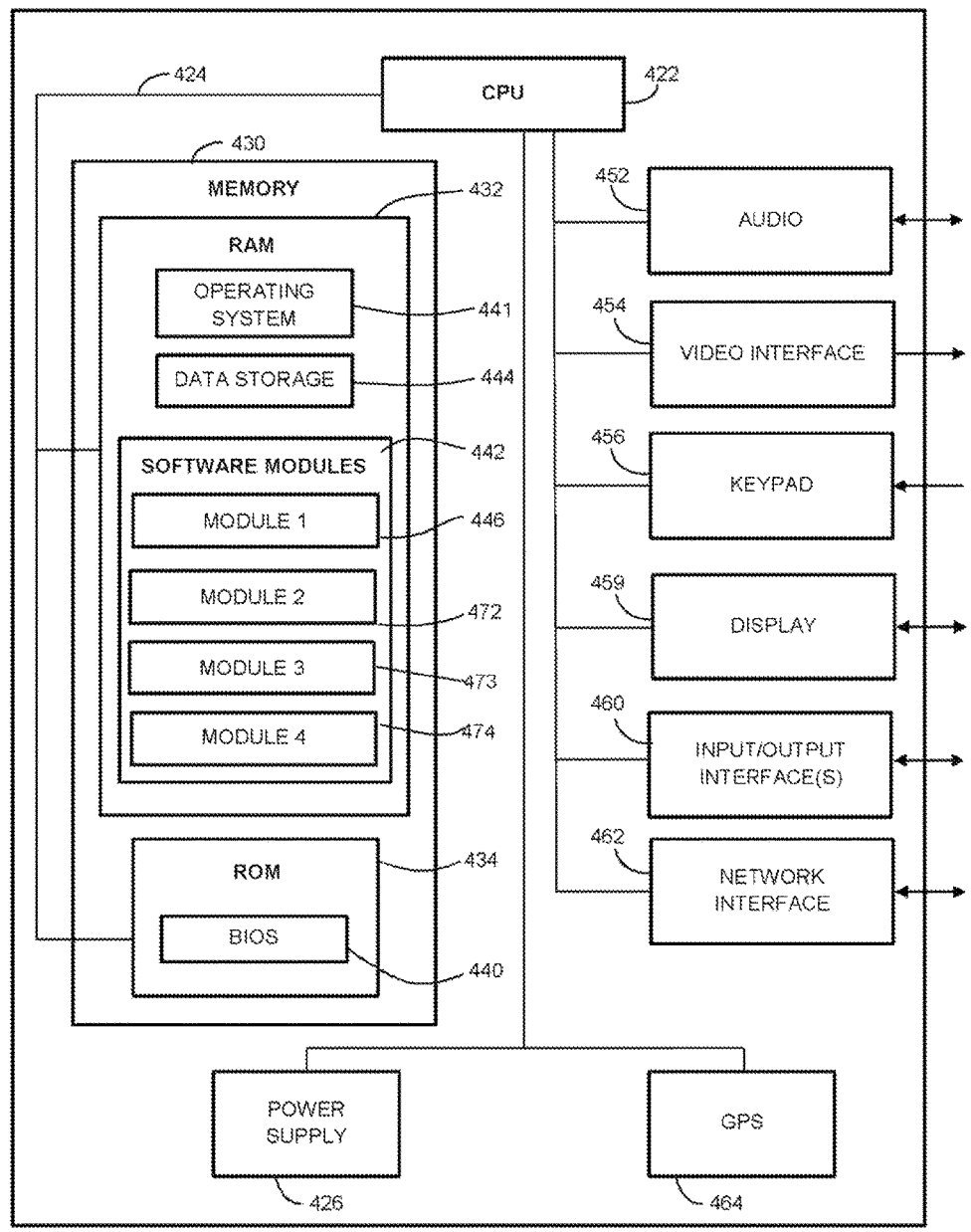
FIG. 4 shows a block diagram of an example processing unit.

FIG. 4 illustrates an example embodiment of computer hardware associated with processing unit 200. As shown in the Figure, example processing unit 200 includes one or more processors (CPUs) 422 in communication with a mass memory 430 via a bus 424. Processing unit 200 also includes a power supply 426, an audio interface 452, video interface 454, an optional keypad 456 or other input device, an optional display 459, and optional additional input/output interfaces 460.

Power supply 426 provides power to processing unit 200. A rechargeable or non-rechargeable battery may be used to provide power. The power may also be provided by an external power source, such as an AC adapter or a powered docking cradle that supplements and/or recharges a battery.

Audio interface 452 is connectable to acoustic visualization device 10 for producing and receiving audio signals, as noted above.

Video interface 454 is arranged to produce video images for display on, and to interface with, acoustic visualization device 10. For example, as noted above, video interface 454 may include one or more of a HDMI interface (such as a micro-HDMI connector) and support wireless display method (such as WiDi and Miracast). Video interface 454 may also optionally be coupled to a digital video camera, or the like, for recording video, such that the video may be overlaid with acoustic visualization images, and/or other virtual reality information or imagery.

Mass memory 430 includes a RAM 432, a ROM 434, and other storage means. Mass memory 430 illustrates another example of computer storage media for storage of information such as computer readable instructions, data structures, program modules or other data. Mass memory 430 stares a basic input/output system ("BIOS") 440 for controlling low level operation of processing unit 200. The mass memory also stores an operating system 441 for controlling the operation of processing unit 200. It will be appreciated that this component may include a general purpose operating system such as a version of UNIX, or LINUX™, or a specialized client communication operating system such as iOS™, Android™, or Windows Mobile™ operating system. The operating system may include, or interface with a Java virtual machine module that enables control of hardware components and/or operating system operations via Java application programs.

Memory 430 further includes one or more data storage 444, which can be utilized by processing unit 200 to store, among other things, software modules 442, and/or other data. For example, data storage 444 may also be employed to store information that describes various capabilities of processing unit 200.

Software modules 442 may include computer executable instructions which, when executed by processing unit 200, perform actions such as, but not limited to processing audio signals received from acoustic visualization device 10 to identify and/or localize audio sources, filter received audio signals, and produce visual renderings of the received audio signals for display to the user via audio visualization device 10. Software modules 442 are described in more detail in FIG. 5.

Optional keypad 456 may comprise any input device arranged to receive input from a user. For example, keypad 456 may include a push button numeric dial, or a keyboard. Keypad 456 may also include command buttons that are associated with selecting and sending images. Keypad 456 may be presented virtually on a touch-sensitive display.

Optional display 459 may be a liquid crystal display (LCD), gas plasma, light emitting diode (LED), or any other type of display used with a computing device. Display 459 may also include a touch sensitive screen arranged to receive input from an object such as a stylus or a digit from a human hand.

Processing unit 200 may also comprise input/output interface 460 for communicating with external devices or other input or output devices not shown in FIG. 4. Input/output interface 460 can utilize one or more communication technologies, such as USB, infrared, Bluetooth™, Wi-Fi, Zigbee, or the like.

Optional GPS transceiver 464 can determine the physical coordinates of processing unit 200, which typically outputs a location as latitude and longitude values. GPS transceiver 464 can also employ other geo-positioning mechanisms, including, but not limited to, triangulation, assisted OPS (AGPS), E-OTD, CI, SAI, ETA, BSS or the like, to further determine the physical location of processing unit 200 on the surface of the Earth. It is understood that under different conditions, GPS transceiver 464 can determine a physical location within millimeters for processing unit 200; and in other cases, the determined physical location may be less precise, such as, within a meter or significantly greater distances. In one embodiment, however, a computing device may through other components, provide other information that may be employed to determine a physical location of the device, including for example, a MAC address, IP address, or the like.

Processing unit 200 may optionally communicate with a base station (not shown), or directly with another computing device. Network interface 462 includes circuitry for coupling processing unit 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 450 is sometimes known as a transceiver, transceiving device, or network interface card (NIC).

In yet another embodiment, processing unit 200 may function as a client device that interfaces with an additional local or remote computing device, over a network. For example, in one embodiment, processing unit 200 may include a network interface configured to support communication with a remote computing device over the internet, such that at least a portion of the processing of the audio signal, and/or the rendering of the acoustic visualization, is performed remotely. The remotely processed acoustic signal and/or acoustic visualization signal or data may then be transmitted to the acoustic visualization device, for display and/or further processing.

Embodiments of the disclosure can be implemented via the microprocessor(s) and/or the memory. For example, the functionalities described above can be partially implemented via hardware logic in the microprocessor(s) and partially using the instructions stored in the memory. Some embodiments are implemented using the microprocessor(s) without additional instructions stored in the memory. Some embodiments are implemented using the instructions stored in the memory for execution by one or more general purpose microprocessor(s). Thus, the disclosure is not limited to a specific configuration of hardware and/or software.

While some embodiments can be implemented in fully functioning computers and computer systems, various embodiments are capable of being distributed as a computing product in a variety of forms and are capable of being applied regardless of the particular type of machine or computer readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

A computer readable storage medium can be used to t e software and data which when executed by a data processing system causes the system to perform various methods. The executable software and data may be stored in various places including for example ROM, volatile RAM, nonvolatile memory and/or cache. Portions of this software and/or data may be stored in any one of these storage devices. As used herein, the phrases "computer readable material" and "computer readable storage medium" refers to all computer-readable media, except for a transitory propagating signal per se.

Figure 5:
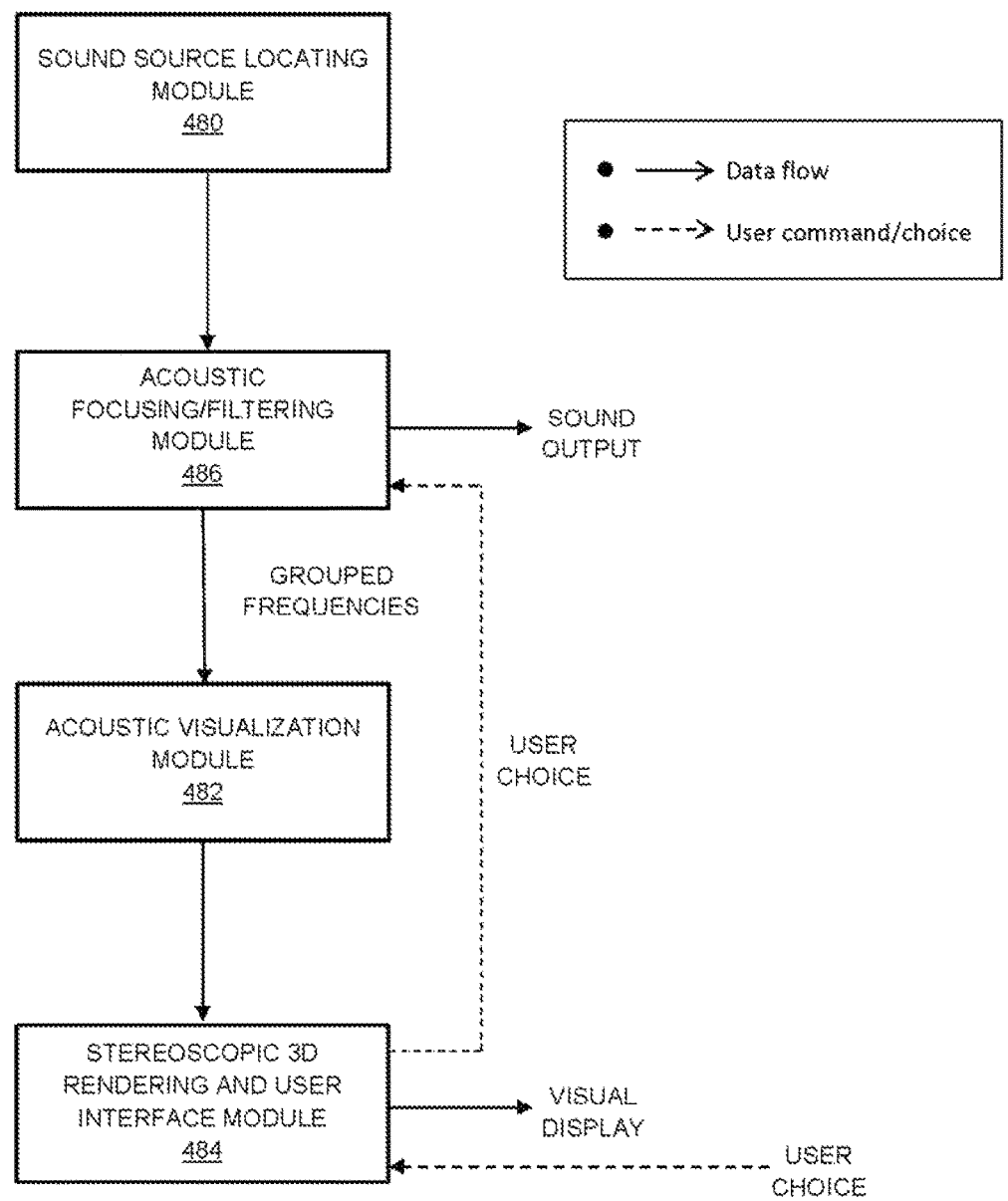
FIG. 5 shows four major modules of an example software system, including their relationships to each other and to the user.

FIG. 5 shows a block diagram illustrating several software modules that may be executable by processing unit 200, and the relationship between the modules in terms of the process flow. As shown in the figure, the software modules include, but are not limited to, sound source locating module 480, acoustic visualization module 482 (e.g. for performing a sound-color translation algorithm), a stereoscopic 3D display module 484, and an (optional) sound source focusing/filtering module 486. In one embodiment, module 48$ may be implemented as a pre-processing module, for use with hearing-aid devices for example, for assisting non-deaf people to focus hearing on target in a noisy environment). The individual modules, and example methods associated therewith, are described below.

Figure 6:
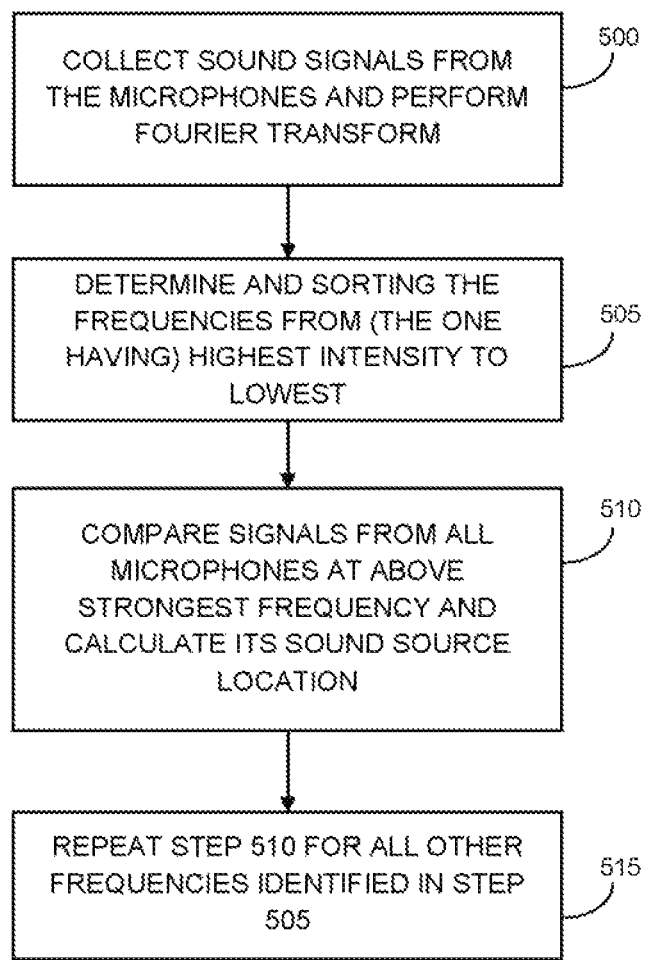
FIG. 6 is a flow chart illustrating an example implementation of the Sound Source Locating Module.

Referring now to FIG. 6, a flow chart is provided that illustrates an example method of performing sound source localization, which can be executed by sound source locating module 480 of FIG. 5. In step 500, the sound signals from 3 microphones are separately recorded, and a short time Fourier Transform (STFT), realized by a Fast Fourier Transform (FFT) operation at a given point in time based on a moving window of time data, is performed to obtain the real-time frequency spectrum for each signal. The frequency spectrum can be shown as sound intensities (in decibels) at different frequencies.

In step 505, the frequency spectrum from one or more of the microphones is processed to compare the sound intensities at different frequencies in order to find one or more frequencies which has the highest sound intensity (the "loudest frequencies"). "A frequency", as used herein, may pertain to a frequency band having a finite bandwidth associated therewith.

In some embodiments, the stronger (e.g. louder) the sound intensity within a given frequency band, the broader the bandwidth around this frequency. This is to simulate the auditory masking properties of human hearing.

It will be understood that two or e of the loudest frequencies may be associated with the same sound source, or different sound sources. The calculated location(s) (as described below) may be used to determine whether or not the sounds are produced by a single sound source or more than one sources.

At step 510, the signals at the loudest frequency identified in step 505 are obtained from each microphone and processed to determine the position of the sound source (an example method is described below with reference to FIGS. 7A-7C). As shown in step 515, the preceding steps are repeated to find the locations for additional frequencies that were identified in step 505. In one embodiment, the number of frequencies identified in step 505 may be one, in order to identify a single sound source. In other embodiments, the number of frequencies identified in step 505 may be two or more, such as 2-10 frequencies. In other embodiments, the number of frequencies identified in step 505 may be ten or more frequencies.

Figure 7A:
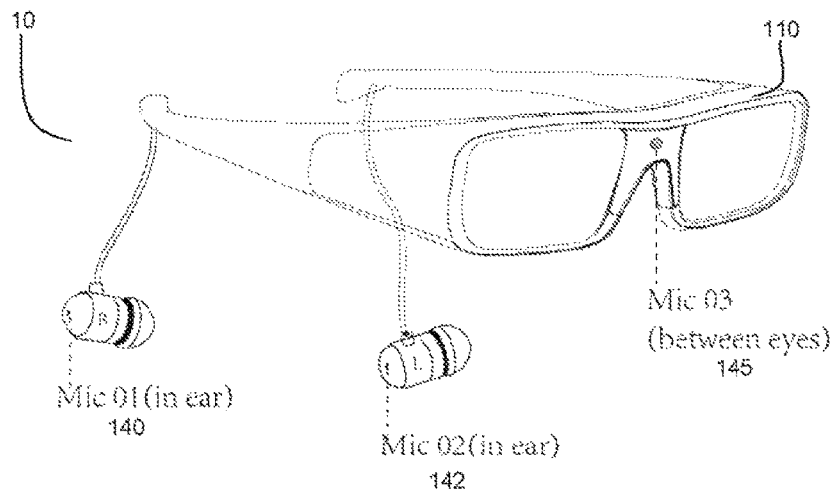
FIG. 7A shows an example acoustic visualization device having three microphones for sound source locating.
Figure 7B:
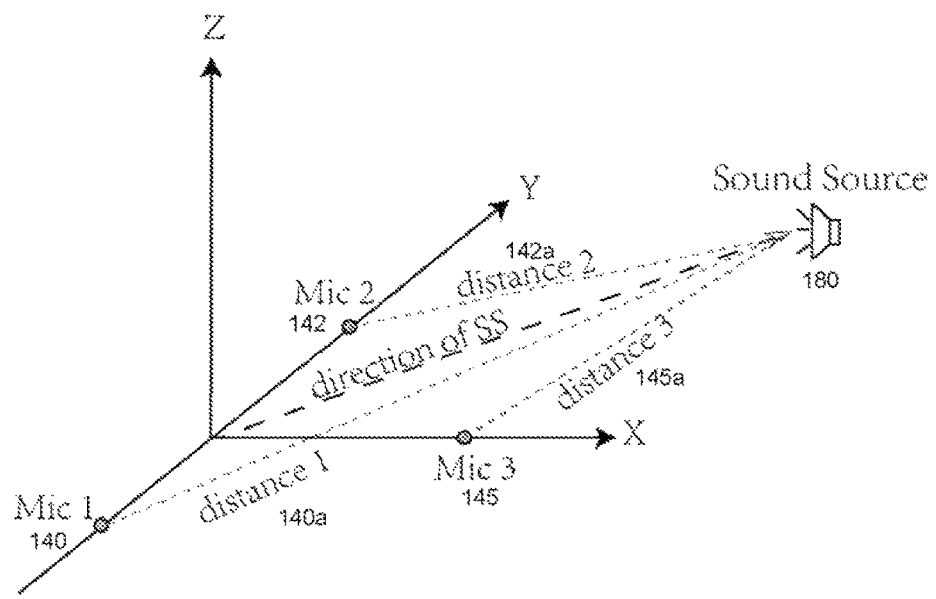
FIG. 7B shows the spatial relationships between the three microphones and the acoustic sound source.
Figure 7C:
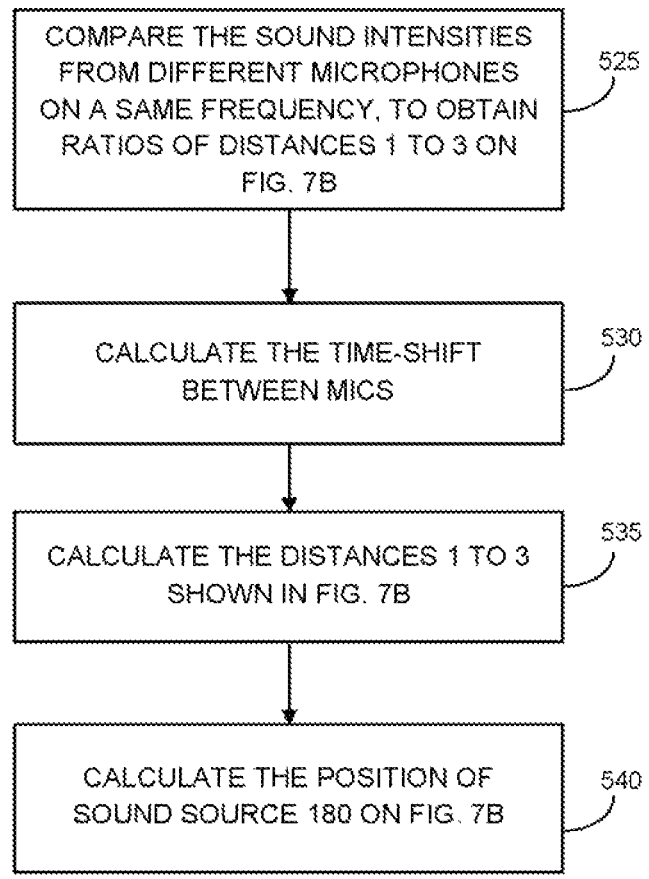
FIG. 7C is a flow chart illustrating an example method for sound localization.

FIGS. 7A-7C describe an example implentation of a method for locating a sound. The methods shown can be employed to perform steps 510 and 515 of FIG. 6.

FIG. 7A shows an example implementation of an audio visualization device 10 (as shown in FIG. 1), in which three microphones are employed for echolocation. At any moment $T_0$, The acoustical power W at a distance r from an acoustic source is given by:

$$W = \frac{a}{r^2}, \text{ or } W \propto \frac{1}{r^2}$$

where a is a constant. Accordingly, the distance r is related to the measured intensity by $r \propto \sqrt{W}$, and the distance from the sound source to each of the three microphones is given by:

$$r_i = b\sqrt{W_i}, \text{ or } r_1:r_2:r_3 = \sqrt{W_i}:\sqrt{W_i}:\sqrt{W_i} \qquad (1)$$

where i={1, 2, 3} denotes each of the three microphones, b is a constant, and W is the acoustical power (acoustic intensity) measured by a given microphone. As shown in FIG. 7B, due to the placement of the microphones 140, 142 and 145 at different locations on frame 110, the time duration for the propagation of the sound from the sound source 180 to the may differ for each microphone. Accordingly, for a given pair of microphones i and j, the difference in the distances between the microphones and the sound source is given by the time delay between the arrival times as follows:

$$r_j - r_i = v_s(t_j - t_i)$$

where $v_s$ the speed of sound in air.

An example method of locating the position of a sound source is now provided with reference to FIG. 7O.

The sound intensities detected by the three microphones are employed to calculate the ratios of the distances $r_1$, $r_2$ and $r_3$, as described above, and as shown in step 525 of FIG. 7C.

The time-shift between Mic 1 and Mic 2 is then determined in step 530, as described below:

Since a FFT is being performed in real-time, at each tire-point, the acoustic intensity at each frequency is available.

On one frequency, for each microphone, calculate the time from $T_0$ to the next maximum regional value of acoustic intensity (say $W_{max-i}$);

This time is denoted $T_1$ for Mic 1, and $T_2$ for Mic 2.

Then $|T_1-T_2|$ is the time shift between the two microphones.

The distance 1 to 3 ($r_1$, $r_2$ and $r_3$) are then calculated in step 535, as described below:

1. The distance difference is obtained by:

$$r_2 - r_1 = v_s |T_1 - T_2| \qquad (2)$$

From equations (1) and (2), the distances $r_1$ and $r_2$ can be obtained;

Referring back to equation (1), the distance can be obtained by its ratio to $r_1$;

The Position of Sound Source is therefore determined by the distances $r_1$, $r_2$ & $r_3$.

Finally, the position of the sound source (180 on FIG. 7B) is calculated in step 540, as described below:

Based on the aforementioned method, the distances $r_1$, $r_2$ & $r_3$ are obtained.

The positions (coordinates) of the microphones (Mics 1 to 3) are known (see FIG. 7B, where the positions of the microphones are shown on the glasses 10. For example: the coordinates of mics 1 to 3 may be (0, $-y_1$, 0), (0, $y_1$, 0) and ($x_1$, 0, 0);

The coordinates of the sound source 180 may then be calculated from this information, which provides 3 equations with 3 unknowns:

$$\text{Vector}(x,y,z) - \text{vector}(0,-y_1,0) = r_1; \qquad 1)$$

$$\text{Vector}(x,y,z) - \text{vector}(0,y_1,0) = r_2; \qquad 2)$$

$$\text{Vector}(x,y,z) - \text{vector}(x_1,0,0) = r_3; \qquad 3)$$

These equations may be solved to obtain the coordinates of sound Source 180 (x, y, z).

Figure 8:
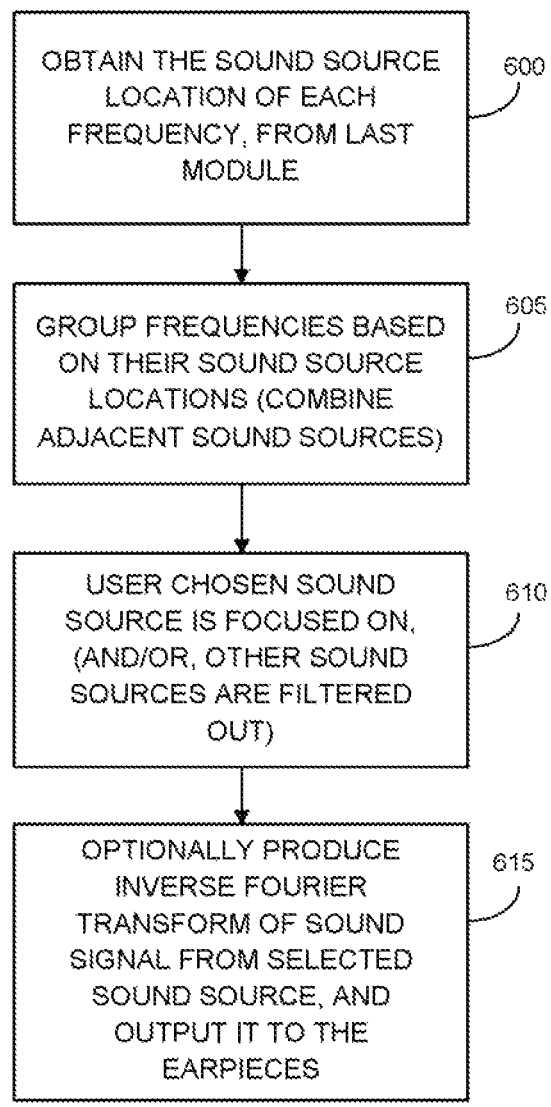
FIG. 8 is a flow chart illustrating an example implementation of the Acoustic Focusing/Filtering Module.

Referring now to FIG. 8, a flow chart is provided that illustrates an example method of performing focusing and/or filtering of a measured audio signal. In step 600, the sound source location(s) are provided for the frequencies having the highest acoustic intensity (the "loudest frequencies").

As shown at step 605, the frequencies associated with different sound source positions are grouped according to their distances relative to each other, such that frequencies associated with a common sound source location are grouped together as a single sound source. For example, if the average distance between every z sound sources is expected to be approximately 1 meter, then all frequencies/sound sources within 0.5 meter to each other are grouped together. In other words, sound sources can be grouped together based on having a spatial separation that is less than a pre-selected threshold. The new position of grouped sound sources will then be calculated. For example, in one embodiment, the sound source location may be determined as the location of the frequency having the acoustic signal with the highest intensity. In another example embodiment, the sound source location may be obtained by averaging the locations associated with the different frequencies within a group.

Figure 9:
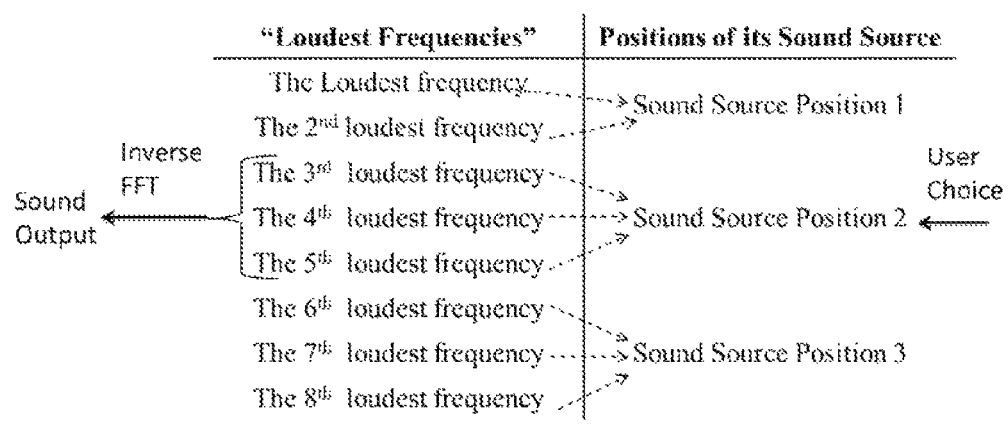
FIG. 9 shows an example illustration and algorithm of the Acoustic Focusing/Filtering Module, involving the grouping of frequencies by sound source position, and focusing/filtering based on user chosen sound source.

This grouping is illustrated in FIG. 9, where it is shown that a given sound source may have more than one associated frequency. As shown in the Figure, a given sound source may be identified by determining which frequencies have a common sound source position. In the example that is shown in the Figure, three sound sources produce sounds that result in eight frequencies being identified, and acoustic signals at the frequencies are associated with specific sound sources based on the position of the sound sources. In order to perform further processing of a given sound source, for example, in order to generate time-dependent data for rendering visually, the frequency-domain signals from each of the frequencies associated with the given sound source may be summed, and a time-dependent acoustic signal associated with the given sound source may be obtained by performing an inverse Fourier transform (such as an inverse FFT), thereby obtaining a time-domain representation of the localized signal. It is noted that the grouping of frequencies is also shown in FIG. 5.

These locations of the sound sources may subsequently employed for processing and rendering of a visual representation of the sound, as described further below. For example, the locations of the sound sources may be provided to the acoustic visualization module 482.

In some embodiments, a specific sound source tray be identified by a user (e.g., the wearer of the acoustic visualization device). For example, referring again to FIG. 8, at step 610, a location/sound source may be chosen by user to be focused on and signals from other sound sources/locations/frequencies may be filtered out.

As shown in FIGS. 8 and 9, a time-dependent acoustic signal may be filtered from the net acoustic signal by summing the frequency components associated with the selected sound source, and performing an inverse Fourier transform (e.g. an inverse FFT) of the summed frequency components to obtain a time-domain representation. This time-dependent signal represents a filtered version of the sound signal focused on the user-selected sound source. This filtered version may be played back to the user through one or more speakers that may reside within earpieces 150 (shown in FIG. 1).

Such a filtering method, in which a specific sound source is selected by a user visually based on a visual rendering of the various sound sources, and the net (total; composite) sound signal is subsequently filtered to produce a filtered sound signal containing the sound associated with the selected sound source, may be useful in a wide variety of applications. For example, such an embodiment, or variations thereof, may be employed for as a hearing assisted device, in order to allow the device wearer to focus on specific sound sources and listen to playback of a filtered version of the detected sound. It is to be understood that the user or device wearer may select one or more additional sound sources for filtering, such that the user may obtain a filtered version of the sound signal based on multiple sound sources (such as multiple speakers in a conversation).

Figure 10:
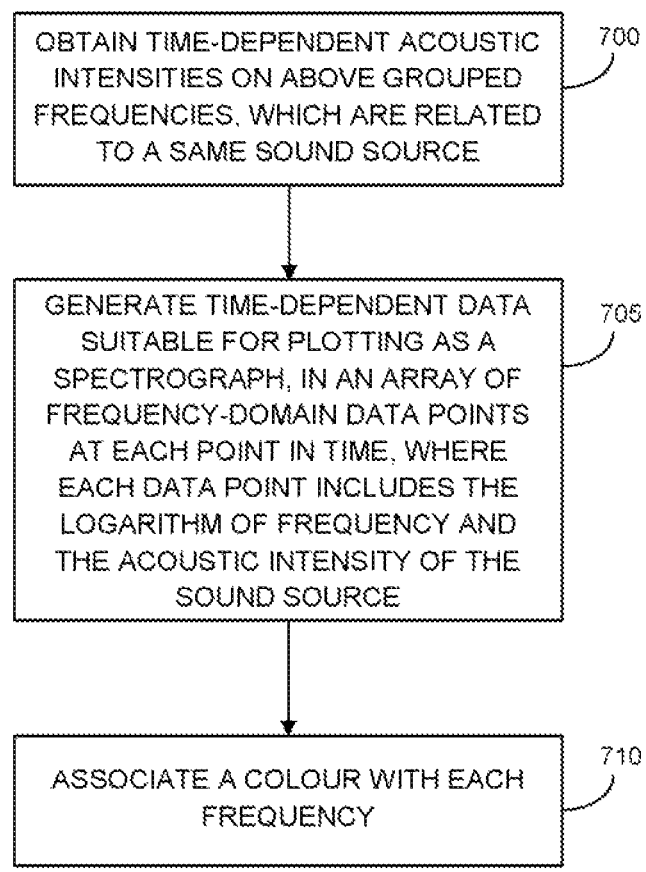
FIG. 10 is a flow chart illustrating an example implementation of the Acoustic Visualization Module.

Referring now to FIG. 10, a flow chart is provided that illustrates an example method of processing the acoustic signal associated with a given sound source, such that it may be shown as an acoustic visualization. In step 700, time-dependent frequency data (a spectrum) is obtained for a sound source (having been located according to the aforementioned locating method). This data is obtained by the audio focusing/filtering method described above, and the spectral content from multiple frequencies associated with a given location are simply combined.

In step 705, the time-dependent data is processed to generate a time-dependent representation that is suitable for plotting as a spectrograph (e.g. one a two-dimensional coordinate system). The data may be prepared by performing a FFT on the time-dependent acoustic signal associated with the given sound source at a given point in time (using a suitable time window), and computing, for a given point in time a set of frequency-domain data points, where each frequency-domain data point includes the logarithm of frequency, and the intensity of the acoustic signal of the sound source. In other words, the data is stored in a format suitable for plotting as a time-dependent spectrograph, where the V axis of the spectrograph is the logarithm of sound frequencies (optionally mapped to colour, i.e. associated with colour, as shown at step 710) and the X axis is time, and where the acoustic intensity of the sound at a given frequency and point in time is shown by the intensity of the displayed pixel.

This spectrogram may be plotted, for example, according to the following example implementation. At a given point in time, a first vertical column of pixels may be plotted, where the values of the pixels is related to the logarithm of the sound frequencies (which are obtained from the FFT). As noted above, the sound frequencies may be mapped to colour, and the acoustic intensity at each frequency and time point may be represented by the intensity of the displayed pixel. At the next point in time, another vertical column of pixels is plotted adjacent to the first column of pixels. This process may be repeated in real time or near real-time, and the spectrograph can be animated by moving the columns horizontally as new columns of frequency data are added with time.

In one example implementation, sound frequencies (e.g. from 0 Hz to approximately 44100 Hz) are mapped to colors (e.g. from red to purple), with each frequency being represented by a dedicated color, as shown at step 710. This frequency-to-color, one-on-one, mapping relationship, may be employed in various aspects of the methods disclosed herein, and variations thereof.

In one example embodiment, the hue-saturation-value HSV colour model may be employed to map the frequencies into colors. According to one example method, the S value may be fixed (for example, to 50%); the H value may vary with frequencies, e.g. from red (1 Hz sound frequency) to purple (44100 Hz sound frequency); and the V value may changing with the sound intensity at the specified sound frequency—such that the higher the sound intensity, the brighter the color.

As shown at step 720, this process may be repeated for one or more additional sound sources that had been located via the aforementioned echolocation method. The spectrograph data associated with each sound source may be outputted as real time video for each sound source location.

Figure 11:
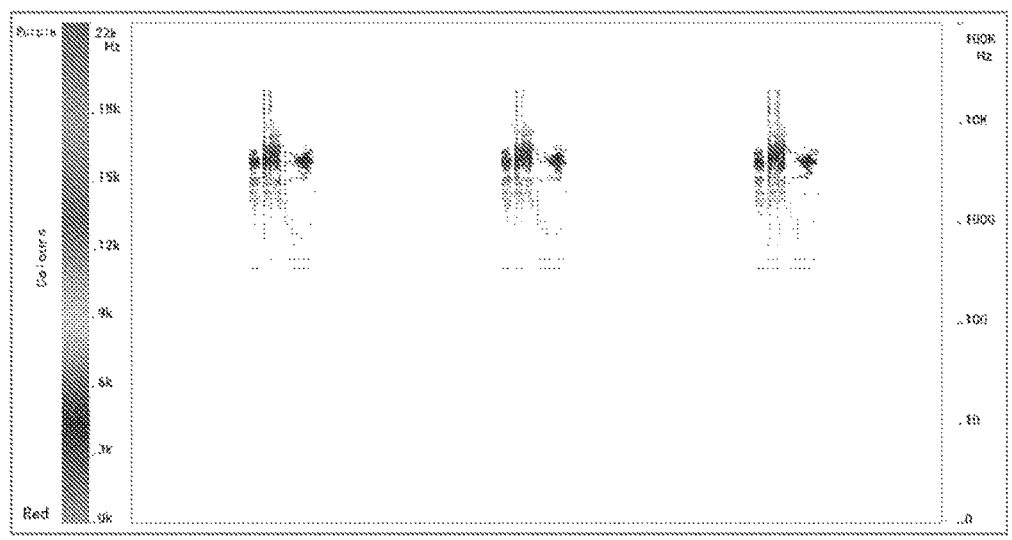
FIG. 11 shows an illustration of an example output of the Acoustic Visualization Module.

FIG. 11 is an illustration showing how the acoustic visualization method can be implemented to produce a visual representation of an audio signal. The figure plots spectrograms of an English phrase "go to school", repeated 3 times, from left to right). As can be seen in the figure, the pattern corresponding to this phrase is distinct and recognizable, even despite minor differences in pronunciation among the three times that the phrase is spoken. In each spectrograph, the Y axis is the logarithm of sound frequencies (the frequencies are one-to-one mapped with colors), and the X axis is time. The stronger the signal, the brighter the display on that pixel.

Figure 12:
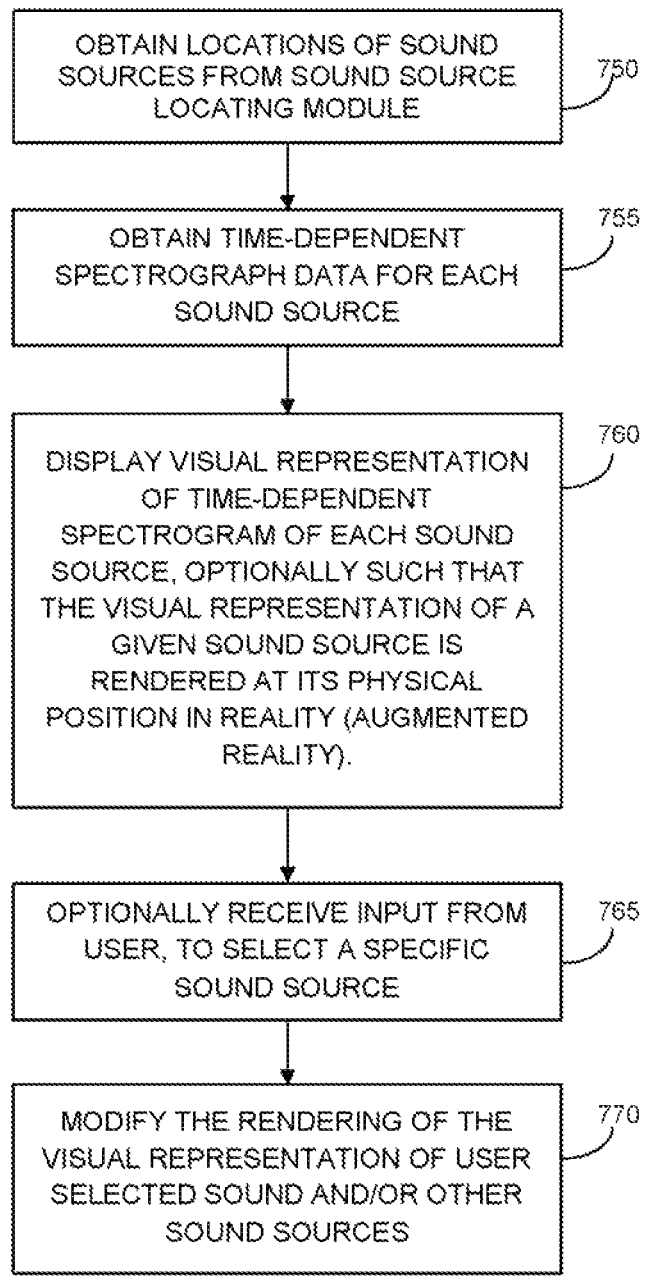
FIG. 12 is a flow chart illustrating an example implementation of the Stereoscopic 3D Rendering and User Interface Module.

Referring now to FIG. 12, a flow chart is provided that illustrates an example method of performing stereoscopic 3D rendering of the computer visual representation of the audio signals from the microphones. In step 750, the location of one or more sound sources are obtained, having been previously determined via the aforementioned sound locating method described in FIGS. 6 and 7A-C (e.g. using the Sound Source Locating Module 480 shown in FIG. 5). In step 755, the time-dependent spectrograph data (suitable for rendering as an acoustic visualization) is obtained for each sound source (using the methods described in FIG. 8).

The time-dependent spectrograph data for each sound source is then displayed on the acoustic visualization device in step 766. For example, this data may be displayed as real-time 2D video, so that the wearer of the device can see both the image of the scene (e.g. as a video signal or as the actual image transmitted through a transparent optical element) and a visual representation of the time-dependent frequency content associated with one or more sound sources. As noted above, the display of the visual representation of the sound may be achieved using virtual reality or augmented realty devices such as stereoscopic 3D projection glasses (such as iGlass from Apple and Google Glass).

In some embodiments, the visual representation of the sound from the sound source may be performed such that the visual representation is rendered or projected at the position within the visual field corresponding to the sound source location that as determined via sound source localization.

As shown in steps 765 and 770 of FIG. 12, the rendered visualization may be refined based on input from a user (e.g. the wearer of the device), in which the user selects a particular sound source from the set of identified sound sources. The user selection can be made via one of a wide variety of input methods, such as, but not limited to, eye-tracking, finger-point reorganization, or as simple as a mouse/touchpad. Upon receiving the input from the user identifying the sound source, the visual representation of the sound from the selected sound source, and/or the other non-selected sound sources, may be modified. For example, the display of the spectrogram associated with the selected sound source may be enlarged. In another example, the display of the spectrogram associated with the non-selected sound sources may be reduced in size. The selected source may also be provided to the acoustic focusing/filtering module 486 for subsequent processing.

Figure 13:
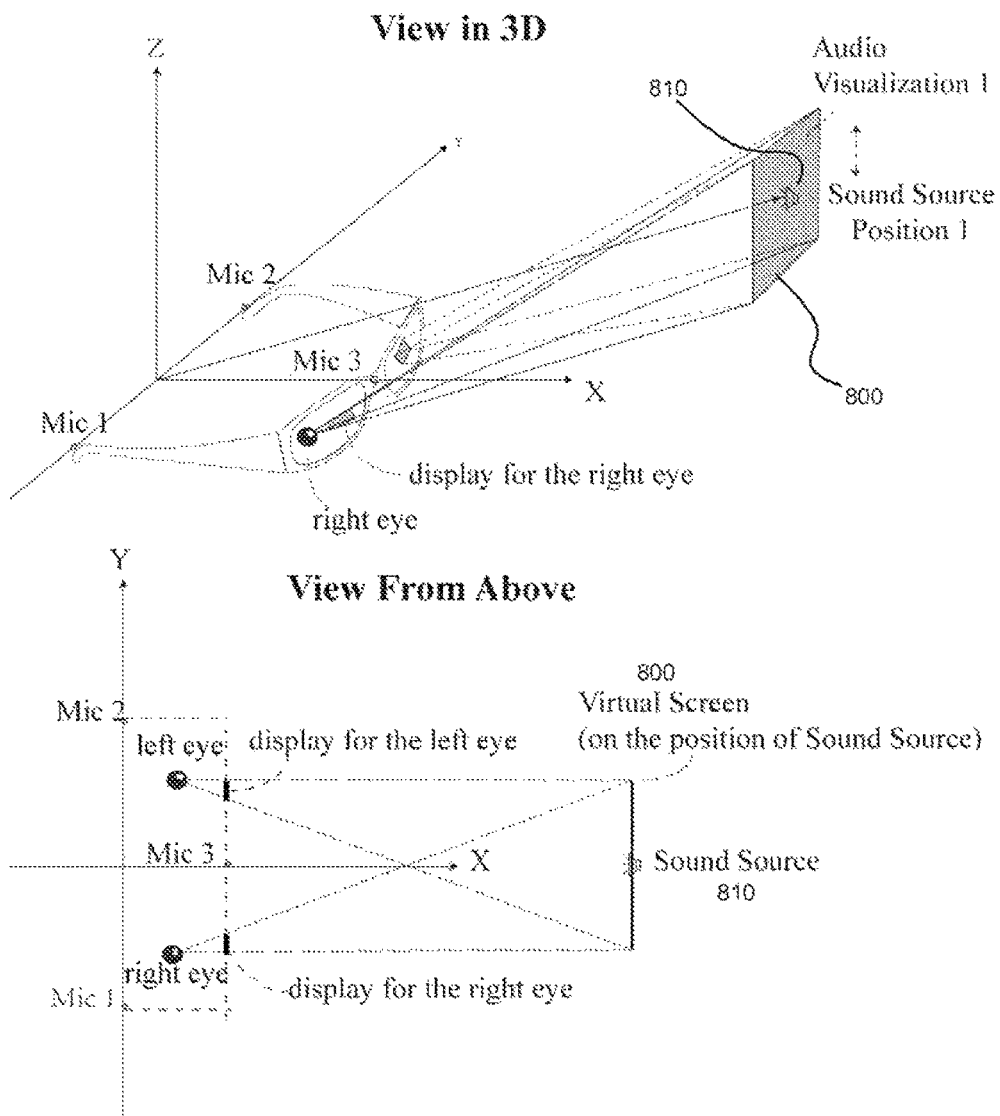
FIG. 13 is an illustration showing an example implementation of stereoscopic rendering, as performed by the Stereoscopic 3D Rendering and User Interface Module.

FIG. 13 is an illustration showing how the stereoscopic 3D rendering method can be implemented to render the computed visual representation of an audio signal. An example implementation of stereoscopic rendering is therefore as follows. In steps 750 and 755, respectfully, the sound source locations and time-dependent spectrograph data are obtained for each sound source.

In step 760, an acoustic graphic is displayed on the acoustic visualization device display for each sound source (or identified group of sound sources), where each acoustic graphic is displayed at a location within the visual field that corresponds to the computed location of the sound source. Each acoustic graphic provides a visual rendering of the sound, such as the spectrogram shown in FIG. 11. The acoustic graphics are rendered on the display device (e.g. 3D display glasses), for one or both eyes (e.g. stereographically), by identifying the appropriate pixels of the display that correspond to the position of the sound source associated with the acoustic graphic.

The following example implementation provides a method for visual rendering of acoustic graphics for both eyes of a wearer using an acoustic visualization device, with reference to the illustration shown in FIG. 13. For a given sound source, a virtual screen 800 is defined at the location of the sound source 810. This virtual screen corresponds to the perceived size and location of the acoustic graphic by the wearer of the device. For each pixel of virtual screen 800, a line is connected between the pixel and the center of the right eye (of the wearer). The point where the line intersects the right display element is the pixel of the acoustic graphic which should be displayed with the same content as the pixel on virtual screen 800. This same process is repeated for the display element corresponding to the left eye. This process is then repeated for each pixel on virtual screen 800 in order to render the acoustic graphic for the display elements corresponding to the left and right eyes.

The aforementioned method may then be repeated for the virtual screens corresponding to other sound sources. The final displays of the acoustic graphics may be defined in both left and right display elements. If there is any overlapping of the acoustic graphics, priority may be given to display only one of the acoustic graphics. For example, the acoustic graphic to be displayed may be selected according to the following example priority scheme: $1^{st}$, display the user selected sound source; $2^{nd}$, display the sound source which has the "louder" frequency.

The aforementioned method thereby provides a spatially registered and rendered acoustic visualization in both the left and right displays of the acoustic visualization device, which will produce stereoscopic 3D images in wearer's brain, through the difference between the display to their left eye and the display to their right eye. It will be understood that, the aforementioned method may alternatively be performed for a single eye, without stereoscope projection.

In some embodiments, the aforementioned acoustic visualization and localization device may be employed for improving the pronunciation of deaf or hearing-impaired individuals. By observing visualized sound, mouth movement and face expressions at the same time with the semi-transparent display system described above, a deaf or hearing-impaired person may be able to improve their speech by comparing, and attempting to match the visual rendering their voice to the visual rendering of properly spoken sounds or words (e.g. sounds from a reference library or sounds from another individual with proper hearing). Such applications may improve the ability of deaf or hearing impaired individuals to communicate with normal-hearing individuals.

Some aspects of the present disclosure may also provide assistive hearing devices for partly-impaired people (and normal hearing people) to locate and focus on target sound source in a noisy environment. When comparing with normal hearing-aid devices, the present embodiments may help locate and focus on the sound sources) which they are interested in.

In some embodiments, the acoustic visualization device may be worn by a person having a hearing deficit, and the acoustic visualizations may be rendered to substitute or supplement hearing with vision. The person may be clinically deaf, and the acoustic visualizations maybe rendered to substitute hearing with vision. In some embodiments, the acoustic visualization device may be employed to train a hearing impaired person to visualize sounds. The acoustic visualization device may also be employed to train the person to improve their speech based on visualizing their speech relative to reference sounds, such as properly spoken sounds made by a person without a hearing impairment, of properly spoken words that are digitally synthesized.

For example, in one embodiment, the detected gaze direction (by any existing eye tracking system) of the wearer, or his/her selection of the sound source(s) displayed in our system (see FIG. 13) may be employed to selectively filter out other sound sources or amplify user selected sound source(s). For example, a gaze detection and filtering method may performed as follows. The acoustic visualization device (e.g. glasses) displays a colored spectrogram on each (grouped) sound source. When detected gaze direction match one of the sound source position, the sound information (in the form of spectrogram) from that source will be selected. The selected sound spectrogram will be transferred back to sound (with inverse Fourier transformation). This sound (which is the original sound from the selected sound source) is outputted to the speakers in the earpieces (e.g. earpieces 150 in FIG. 1) on the acoustic visualization device, while other sounds are not outputted, thereby filtering out the sounds originating from locations not associated with the gaze direction.

In some embodiments, the acoustic spectral bandwidth of the visualized acoustic signals lies within the range of human speech. For example, the acoustic spectral bandwidth may within the range of approximately 300 Hz to 3400 Hz, or a portion thereof. In some embodiments, the acoustic spectral bandwidth of the visualized acoustic signals is within the range of human hearing. For example, the acoustic spectral bandwidth may within the range of approximately 20 Hz to 20 kHz, or a portion thereof. In other embodiments, the acoustic spectral bandwidth may include, or be limited to, frequencies beyond those associated with human speech or hearing. For example, in some embodiments, the acoustic spectral bandwidth may include ultrasound and infrasound (sound having frequencies below approximately 20 Hz). Such embodiments may find application in military and industrial settings. For example, such acoustic spectral ranges may allow the wearer of the acoustic visualization device to see the ultrasound, infrasound, and/or hear selected audible sound in a very noisy environment.

It will be understood that acoustic visualization devices and methods provided herein may assist in training the human brain to comprehend sound visualization signals as sound signal itself, hence rebuild deaf people's hearing and speaking ability, with the help of their vision ability.

An example potential military application of the present disclosure is now described. There is often are substantial amount of noise in the battle field, and such noise is damaging the hearing of solders. The methods and devices described herein can be employed to block their ears to protect their hearing; while at the same time, to display sound on their glasses (or helmet) and help them to comprehend sound through their eyes (a certain training may be needed before they go to the battle field). In another implementation, with some additional hardware (a specified speaker and a specified microphone which can produce/receive ultrasound or infrasound), a visual representation and audio filtering (according to user selection of sound source) of ultrasound and/or infrasound that is present on the battlefield can also be provided.

While the embodiments disclosed above pertain to example implementations involving the visualization of sound other embodiments may employ input associated with one or more other non-visual senses, for the visualization of input from one or more senses other senses with a sense visualization device (optionally in addition to the visualization of audio input). For example, sensors associated with smell, such as artificial noses, may be provided on or interfaced with the sense visualization device. Alternatively or additionally, sensors associated with taste may be provided on or interfaced with the sense visualization device. In some embodiments, a sufficient number of sensors associated with a given sense are provided such that sources can be identified in at least two dimensions.

Accordingly, in some embodiments, aspects of the present disclosure may be considered as, or function as, a non-invasive "port" or conduit to the brain (not only for sound). Using the principles of this disclosure wearers can connect any signal input system (e.g. sensors) to the brain through the eyes and train their brain to accept that input as a new kind of human sense.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

Therefore what is claimed is:

1. A method of generating source-specific spatially filtered audio signals and acoustic visualizations for a wearer of a hearing assistive device, the wearable hearing assistive device comprising a wearable display device, two or more microphones, and a speaker, the method comprising:
   recording, via the microphones, sound signals from one or more sound sources;
   processing the sound signals in the frequency domain to extract localized sound signals associated with at least one of the sound sources;
   rendering, on the wearable display device of the acoustic visualization device, an acoustic graphic providing a visual representation of the localized sound signals;
   receiving input from a wearer of the wearable display device, the input identifying a selected sound source from a plurality of identified sound sources rendered on the wearable display device;
   generating a filtered audio signal comprising sound signals from the selected sound source by summing frequency components associated with the selected sound source and performing an inverse Fourier transform, such that the filtered audio signal excludes audio signals from sound sources other than the selected sound source; and
   employing the speaker to playback an audio output to the wearer of the wearable display device, the audio output comprising the filtered audio signal, thereby allowing the device wearer to focus on the selected sound source in the presence of multiple sound sources.

2. The method according to claim 1 further comprising:
   processing the localized sound signals to obtain a location associated with the localized sound source;
   wherein rendering the acoustic graphic comprises rendering the acoustic graphic, at a position within the visual field of the wearer of the acoustic visualization device, that corresponds to the location of the localized sound source.

3. The method according to claim 1 wherein the acoustic graphic is a frequency-domain representation of the localized sound signals corresponding to the localized sound source.

4. The method according to claim 3 wherein the acoustic graphic employs a logarithmic scale for plotting the frequency of the localized sound signals.

5. The method according to claim 3 wherein the frequency-domain representation associates a dedicated color to each frequency component of the localized sound signals.

6. The method according to claim 1 wherein the acoustic graphic is stereographically rendered in display elements corresponding to both eyes of the wearer of the acoustic visualization device.

7. The method according to claim 1 wherein acoustic visualization device comprises three microphones, and wherein the localized sound source is located in three dimensions.

8. The method according to claim 1 wherein the acoustic visualization device comprises two microphones, and wherein the localized sound source is located within two dimensions.

9. The method according to claim 1 wherein processing the acoustic signals to identify the locations of one or more sound sources comprises:
performing a Fourier transform of the sound signals;
identifying one or more frequency bands based on the intensity of the signal with the frequency bands; and
for each identified frequency band:
performing an inverse Fourier transform to obtain a time domain representation of the acoustic signals corresponding to the identified frequency band;
processing the time domain representation of the acoustic signals to determine a sound source location based on the relative time delay of the arrival of acoustic signals to the microphones, and based on the relative intensity of the acoustic signals detected by the microphones.

10. The method according to claim 1 wherein two or more sound sources are identified, the method further comprising grouping two or more sound sources as a single sound source when the locations of the two or more sound sources have a spatial separation less than a pre-selected threshold.

11. The method according to claim 1 wherein the selected sound source is identified based on the gaze direction of the wearer of the acoustic visualization device.

12. The method according to claim 1 wherein the acoustic visualization device is worn by a person having a hearing impairment, and wherein the acoustic visualizations are rendered to substitute or supplement hearing with vision.

13. The method according to claim 12 wherein the person is clinically deaf, and wherein the acoustic visualizations are rendered to substitute hearing with vision.

14. The method according to claim 12 wherein the acoustic visualization device is employed to train the person to visualize sounds.

15. The method according to claim 1 wherein the acoustic visualization device is worn by a person having a hearing impairment, wherein the sound signals are sounds or words spoken by the person, the method further comprising:
displaying a visualization of the correctly spoken words, thereby providing acoustic feedback by comparing acoustic visualizations of the person's own speech with acoustic visualizations of correctly spoken sounds or words to train the person to improve their speech.

16. An acoustic visualization device comprising:
a wearable display device for displaying an image viewable by a wearer thereof, wherein the wearable display device comprises two display elements for both eyes of the wearer;
two or more microphones associated with the wearable display device; and
computing hardware connected to the display device and the microphones, wherein the computing hardware is configured to:
record, via the microphones, sound signals from a plurality of sound sources;
process the sound signals to extract localized sound signals respectively associated with the plurality of sound sources;
process the localized sound signals to obtain a location associated with the localized sound source; and
stereographically render, in the two display elements of the wearable display device, a plurality of acoustic graphics, each acoustic graphic providing a visual representation of a respective localized sound signal, wherein that the acoustic graphics are rendered such that they are perceived by the wearer as residing at respective positions and depths that correspond to the respective locations of the localized sound sources.

17. The acoustic visualization device according to claim 16 wherein at least two of the microphones are provided such that they are positionable within respective ears of the wearer of the device.

18. The acoustic visualization device according to claim 16 wherein the two or more microphones comprise at least three microphones, and wherein the computer hardware is configured to locate the sound source in three dimensions.

19. The acoustic visualization according to claim 16 wherein the wearable display device is at least partially transparent, thereby allowing the wearer to look through one or more display elements thereof.

20. The acoustic visualization device according to claim 16 wherein the computing hardware is further configured to render the acoustic graphic as a frequency-domain representation of the localized sound signals.

21. The acoustic visualization device according to claim 20 wherein the computing hardware is further configured such that the frequency-domain representation associates a dedicated color to each frequency component of the localized sound signals.

22. A method of rendering an acoustic visualization on an acoustic visualization device, the acoustic visualization device comprising a wearable display device and two or more microphones, wherein the wearable display device comprises two display elements for both eyes of the wearer, the method comprising:
recording, via the microphones, sound signals from a plurality of sound sources;
processing the sound signals to extract localized sound signals respectively associated with the plurality of sound sources; and
processing the localized sound signals to obtain a location associated with the localized sound source; and
stereographically rendering, in the two display elements of the wearable display device of the acoustic visualization device, a plurality of acoustic graphics, each acoustic graphic providing a visual representation of a respective localized sound signal, wherein that the acoustic graphics are rendered such that they are perceived by the wearer as residing at respective positions and depths that correspond to the respective locations of the localized sound sources.

23. A hearing assistive device for generating source-specific spatially filtered audio signals and acoustic visualizations for a wearer thereof, the device comprising:
a wearable display device for displaying an image viewable by at least one eye of a wearer thereof;
two or more microphones associated with the wearable display device;
a speaker; and
computing hardware connected to the wearable display device and the microphones, wherein the computing hardware is configured to:
record, via the microphones, sound signals from one or more sound sources;

process the sound signals in the frequency domain to extract localized sound signals associated with at least one of the sound sources;
render, on the wearable display device, an acoustic graphic providing a visual representation of the localized sound signals;
receive input from a wearer of the wearable display device, the input identifying a selected sound source from a plurality of identified sound sources rendered on the wearable display device;
generate a filtered audio signal comprising sound signals from the selected sound source by summing frequency components associated with the selected sound source and performing an inverse Fourier transform, such that the filtered audio signal excludes sound sources other than the selected sound source; and
employing the speaker to playback an audio output to the wearer of the wearable display device, the audio output comprising the filtered audio signal thereby allowing the device wearer to focus on the selected sound source in the presence of multiple sound sources.

\* \* \* \* \*